(12) United States Patent
Højberg et al.

(10) Patent No.: US 10,601,041 B2
(45) Date of Patent: Mar. 24, 2020

(54) DOPED LITHIUM POSITIVE ELECTRODE ACTIVE MATERIAL AND PROCESS FOR MANUFACTURE THEREOF

(71) Applicant: HALDOR TOPSØE A/S, Kgs. Lyngby (DK)

(72) Inventors: Jonathan Højberg, Kgs. Lyngby (DK); Jakob Weiland Høj, Gentofte (DK); Søren Dahl, Hillerød (DK); Christian Fink Elkjær, Birkerød (DK)

(73) Assignee: HALDOR TOPSØE A/S, Kgs. Lyngby (DK)

( * ) Notice: Subject to any disclaimer, the term of this patent is extended or adjusted under 35 U.S.C. 154(b) by 0 days.

(21) Appl. No.: 16/371,474

(22) Filed: Apr. 1, 2019

(65) Prior Publication Data

US 2019/0348674 A1   Nov. 14, 2019

(30) Foreign Application Priority Data

May 9, 2018   (DK) .................................. 2018 00207
Dec. 5, 2018   (DK) .................................. 2018 00959

(51) Int. Cl.
  *H01M 4/525*  (2010.01)
  *H01M 4/505*  (2010.01)
  *H01M 10/0525*  (2010.01)
  *H01M 4/02*  (2006.01)

(52) U.S. Cl.
  CPC ........... *H01M 4/525* (2013.01); *H01M 4/505* (2013.01); *H01M 10/0525* (2013.01); *H01M 2004/021* (2013.01); *H01M 2004/028* (2013.01)

(58) Field of Classification Search
  CPC .. H01M 4/525; H01M 4/505; H01M 10/0525; H01M 2004/028; H01M 2004/021
  USPC .......................................................... 429/223
  See application file for complete search history.

(56) References Cited

U.S. PATENT DOCUMENTS

2013/0029216 A1   1/2013   Kim et al.
2018/0269476 A1*  9/2018   Xia ...................... H01M 4/505

FOREIGN PATENT DOCUMENTS

| KR | 20080088177 A1 | 10/2008 |
| KR | 20170143037 A | 12/2017 |
| KR | 20180043842 A | 4/2018 |
| WO | 2017032789 A1 | 3/2017 |
| WO | 2017042659 A1 | 3/2017 |
| WO | 2017124859 A1 | 7/2017 |

OTHER PUBLICATIONS

Xiao, J, et al. "High-Performance LiNi 0.5 Mn 1.5 O 4 Spinel Controlled by Mn 3 + Concentration and Site Disorder" Adv. Mater 2012, vol. 24, pp. 2109-2116.
Almeida-Prieto,S. et al."Image Analysis of the Shape of Granulated Powder Grains" Journal of Pharmaceutical Sciences, vol. 93, No. 3, Mar. 2004, pp. 621-634.
Danish Search Report dated Feb. 19, 2019, issued in corresponding Danish Patent Application No. PA 2018 00959. (7 pages).
Office Action (Notice of Grounds for Preliminary Rejection) dated Sep. 9, 2019, by the Korean Intellectual Property Office in corresponding Korean Patent Application No. 10-2019-0048356, and an English Translation of the Office Action. (13 pages).

* cited by examiner

*Primary Examiner* — Gary D Harris
(74) *Attorney, Agent, or Firm* — Buchanan Ingersoll & Rooney P.C.

(57) ABSTRACT

A lithium positive electrode active material including at least 95 wt % spinel having a chemical composition of $Li_xNi_yMn_{2-y-z1-z2}D1_{z1}D2_{z2}O_4$, wherein $0.9 \leq x \leq 1.1$, $0.4 \leq y \leq 0.5$, $0.005 \leq z1 \leq 0.2$, $0 \leq z2 \leq 0.2$, wherein D1 and D2 are dopants chosen between the following elements: Co, Cu, Ti, Zn, Mg, Fe or combinations thereof. D1 and D2 are different dopants, and the lithium positive electrode active material is a powder composed of material particles, wherein the distribution of dopant D1 is non-uniform along a radial axis of the material particles and the distribution of the dopant D2 is substantially uniform along the radial axis of the material particles. Also, a process for preparing the lithium positive electrode active material and a secondary battery comprising the lithium positive electrode active material.

21 Claims, No Drawings

DOPED LITHIUM POSITIVE ELECTRODE ACTIVE MATERIAL AND PROCESS FOR MANUFACTURE THEREOF

CROSS REFERENCE TO RELATED APPLICATIONS

The present application claims the benefit of Danish Application No. PA 2018 00207, filed on May 9, 2018 and claims the benefit of Danish Application No. PA 2018 00959, filed on Dec. 5, 2018. The entire contents of each of Danish Application No. PA 2018 00207 and Danish Application No. PA 2018 00959 are hereby incorporated herein by reference in their entirety.

TECHNICAL FIELD

Embodiments of the invention generally relate to a lithium positive electrode active material, to a process for preparing a lithium positive electrode active material and to a secondary battery comprising the lithium positive electrode active material.

BACKGROUND

Developing high energy density rechargeable battery materials have become a major research topic due to their broad applications in electric vehicles, portable electronics and grid-scale energy storage. Since their first commercialization in the early 1990s, Li-ion batteries (LIBs) present many advantages with respect to other commercial battery technologies. In particular, their higher specific energy and specific power make LIBs the best candidate for electric mobile transport application.

It is an object of the present invention to provide a lithium positive electrode active material having low degradation and maintaining high capacity.

DESCRIPTION

Embodiments of the invention generally relate to a lithium positive electrode active material, to a process for preparing a lithium positive electrode active material and to a secondary battery comprising the lithium positive electrode active material One aspect of the invention relates to a lithium positive electrode active material comprising at least 95 wt % spinel having a chemical composition of $Li_xNi_yMn_{2-y-z1-z2}D1_{z1}D2_{z2}O_4$, wherein $0.9 \leq x \leq 1.1$, $0.4 \leq y \leq 0.5$, $0.005 \leq z1 \leq 0.2$, $0 \leq z2 \leq 0.2$. D1 and D2 are dopants chosen between the following elements: Co, Cu, Ti, Zn, Mg, Fe or combinations thereof, and D1 and D2 are different dopants. The lithium positive electrode active material is a powder composed of material particles, wherein the distribution of dopant D1 is non-uniform along a radial axis of the material particles and wherein the distribution of the dopant D2 is substantially uniform along the radial axis of the material particles.

When the distribution of the dopant D1 is non-uniform along the radial axis of the material particles, it becomes possible to utilized less dopant but still obtain the effect of the dopant. When the dopant D1 is, e.g., Co, the dopant assists in reducing the degradation of the lithium positive electrode active material. Often doping of a material with a stabilizing dopant reduces the capacity of the lithium positive electrode active material; however, when the amount of the dopant is reduced this reduction in the overall capacity of the lithium positive electrode active material. Thereby, the capacity fading during cycling is reduced by the material of the invention compared to a similar LNMO material without doping (viz. $z1=z2=0$ in the formula above), whilst the capacity of the lithium positive electrode active material is close to the capacity of the similar LNMO material. In total the capacity fading at room temperature and at 55° C. is less than 2% with the lithium positive electrode active material of the invention.

The term "non-uniform distribution of D1" is meant to denote that the concentration of the dopant D1 at one part of the particles is different from the concentration of the dopant D1 at other parts of the particles. For instance, the concentration of the dopant D1 at a central part of the particles is different from the concentration of the dopant D1 at a surface part of the particles.

The values of z1 and z2 are given above for the chemical composition of the spinel. Since D1 is non-uniformly distributed throughout the particles, z1 is relatively low; however, the local distribution of D1 may be rather high. Thus, if D1 is mainly at a narrow surface layer, D1 may be a relatively large part of the surface of the particles.

The net chemical composition is a composition for all the lithium positive electrode active material. Thus, the lithium positive electrode active material may comprise impurities having another formula than $Li_xNi_yMn_{2-y-z1-z2}D1_{z1}D2_{z2}O_{4-\delta}$, $-(0.5-y)<\delta<0.1$, wherein $0.9 \leq x \leq 1.1$, $0.4 \leq y \leq 0.5$, $0.005 \leq z1 \leq 0.2$, $0 \leq z2 \leq 0.2$. Wherein D1 and D2 are dopants chosen between the following elements: Co, Cu, Ti, Zn, Mg, Fe or combinations thereof, and D1 and D2 are different dopants. A formula covering a net chemical composition for all the lithium positive electrode active material may be written as: $Li_xNi_yMn_{2-y-z1-z2}D1_{z1}D2_{z2}O_{4-\delta}$, $-(0.5-y)<\delta<0.1$, wherein $0.9 \leq x \leq 1.1$, $0.4 \leq y \leq 0.5$, $0.005 \leq z1 \leq 0.2$, $0 \leq z2 \leq 0.2$. Wherein D1 and D2 are dopants chosen between the following elements: Co, Cu, Ti, Zn, Mg, Fe or combinations thereof, and D1 and D2 are different dopants.

Preferable values of lies in the range from 0.43 to 0.49, and even more preferably values of y lies in the range from 0.45 to 0.47, in that these values of y provides an advantageous compromise between Ni activity, which increases with increased values of y, and the risk of ordering the material, which risk decreases with increased values of y.

In an embodiment, the material particles of said lithium positive electrode active material are primary particles, where the primary particles form secondary particles, wherein at least 95% of the primary particles have a diameter or a volume equivalent diameter of between 100 nm and 2 μm and where at least 95% of the secondary particles have a diameter or volume equivalent diameter of between 1 μm and 25 μm.

Thus, in this embodiment, the term "material particles" is meant to denote "primary particles". Thus, the distribution of the dopant D1 is non-uniform along the radial axis of the primary particles. For example, the dopant material D1 is more concentrated on the surface of the primary particles and gradually decreases toward the core of the primary particles or the dopant D1 may be mostly at the surface of the primary particles in a shell-configuration. An average diameter or average volume equivalent diameter of the primary particles is e.g. about 250 nm. As used herein, the term "volume equivalent diameter" of an irregularly shaped object is the diameter of a sphere of equivalent volume.

In an embodiment, the primary particles of the lithium positive electrode active material are surface modified with the dopant D1. Thus, the dopant D1 is mainly at the surface of the primary particles.

In an embodiment, the dopant D1 is present in the outermost 20% of the primary particles. Thus, the concentration of the dopant D1 decreases from the outer surface of the primary particles towards the core thereof and the concentration of the dopant D1 is very low or zero at a distance from the surface, the distance from the surface being about 20% of the distance from the surface to the center of the particle. In a case, where the primary particles are not circular, the term "center" is to be seen as the geometric center or the center of mass. Since the density of the primary particles is substantially uniform, the geometric center is substantially the same as the center of mass of the primary particles.

In an embodiment, the lithium positive electrode active material is a spinel and wherein the dopant D1 is part of the spinel. Being part of the spinel means that the atoms of the dopant D1 take the place of elements that were in the crystal lattice or crystal structure of the lithium positive electrode material.

In an embodiment, the material particles of the lithium positive electrode active material are secondary particles made up of primary particles, wherein the diameter or the volume equivalent diameter of the primary particles is between 100 nm and 2 μm and where the diameter or the volume equivalent diameter of the secondary particles is between 1 μm and 25 μm. These values of volume equivalent diameter of the primary particles are as measured by SEM or Rietveld refinement of XRD measurements. As used herein, the term "volume equivalent diameter" of an irregularly shaped object is the diameter of a sphere of equivalent volume.

Thus, in this embodiment, the term "material particles" is meant to denote "secondary particles". Thus, the distribution of the dopant D1 is non-uniform along the radial axis of the secondary particles. For example, the dopant material D1 is more concentrated on the surface of the secondary particles and gradually decreases toward the core of the secondary particle or the dopant D1 may be mostly at the surface of the secondary particles in a shell-configuration. An average diameter or average volume equivalent diameter of the primary particles is e.g. 250 nm based upon Rietveld refinement of XRD measurements.

In an embodiment, the secondary particles of the lithium positive electrode active material are surface modified with the dopant D1. Thus, the dopant D1 is mainly at the surface of the secondary particles.

In an embodiment, the dopant D1 is present in the outermost 20% of the secondary particles. Thus, the concentration of the dopant D1 decreases from the outer surface of the secondary particles towards the core thereof and the concentration of the dopant D1 is very low or zero at a distance from the surface, the distance from the surface being about 20% of the distance from the surface to the center of the secondary particle. In a case, where the secondary particles are not circular, the term "center" is to be seen as the geometric center or the center of mass. Since the density of the secondary particles is substantially uniform, the geometric center is substantially the same as the center of mass of the secondary particles.

In an embodiment, the lithium positive electrode active material is a spinel and wherein the dopant D1 is part of the spinel. Again, being part of the spinel means that the atoms of the dopant D1 take the place of elements that were in the crystal lattice or crystal structure of the lithium positive electrode material.

In an embodiment, the lithium positive electrode active material is cation disordered. This means that the lithium positive electrode active material is a disordered space group, e.g. Fd3m. A disordered material has the advantage of having high stability in terms of low fade rate. The symmetry of the spinel lattice is described by space groups of $P4_332$ for the cation ordered phase and Fd–3m for the cation disordered phase with a lattice constant $\alpha$ at around 8.2 Å. Spinel material may be a single disordered or ordered phase, or a mix of both. Adv. Mater. (2012) 24, pp 2109-2116.

In an embodiment, the lithium positive electrode active material comprises at least 95 wt % spinel phase.

In an embodiment, the lithium positive electrode active material has a tap density of at least 1.9 g/cm$^3$. The tap density is preferably equal to or greater than 2.0 g/cm$^3$; equal to or greater than 2.2 g/cm$^3$; equal to or greater than 2.4 g/cm$^3$; or equal to or greater than 2.6 g/cm$^3$. For most battery applications, space is at a premium, and high energy density is desired. Powders of the electrode material with a high tap density tend to result in electrodes with higher active material loading (and thus higher energy density) than powders with a low tap density. It can be shown using geometry-based arguments that materials composed of spherical particles have a higher theoretical tap density than particles with irregular shapes. A higher tap density provides possibility to obtain higher volumetric electrode loading and thus a higher volumetric energy density of batteries containing materials with a high tap density.

In general, the term "tap density" is used to describe the bulk density of a powder (or granular solid) after consolidation/compression prescribed in terms of 'tapping' the container of powder a measured number of times, usually from a predetermined height. The method of 'tapping' is best described as 'lifting and dropping'. Tapping in this context is not to be confused with tamping, side-ways hitting or vibration. The method of measurement may affect the tap density value and therefore the same method should be used when comparing tap densities of different materials. The tap densities of the present invention are measured by weighing a measuring cylinder before and after addition of at least 10 g of powder to note the mass of added material, then tapping the cylinder on the table for some time and then reading of the volume of the tapped material. Typically, the tapping should continue until further tapping would not provide any further change in volume. As an example only, the tapping may be about 120 or 180 times, carried out during a minute.

In an embodiment, the BET surface area of the secondary particles is below 0.25 m$^2$/g. The BET surface may be down to about 0.15 m$^2$/g. It is advantageous that the BET surface area is low since a low BET surface area correspond to a dense material with a low porosity. Since degradation reactions occur on the surface of the material, such a material typically is a stable material. The undoped LNMO material is a low surface LNMO material, in terms of BET surface area, which is advantageous to obtain the good performance of the lithium positive electrode active material of the invention. The doped LNMO material retain the stable characteristics of the undoped LNMO material and is improved further in relation to stability during charge/discharge.

In an embodiment, the secondary particles are characterized by an average circularity higher than 0.75 and simultaneously an average aspect ratio lower than 1.50. Preferably, the average aspect ratio is lower than 1.2 whilst the average circularity is higher than 0.75. There are several ways to characterize and quantify the circularity or sphericity and shape of particles. Almeida-Prieto et al. in J. Pharmaceutical Sci., 93 (2004) 621, lists a number of form factors that have been proposed in the literature for the evaluation of sphericity: Heywood factors, aspect ratio, roughness, pellips, rectang, modelx, elongation, circularity, roundness, and the Vp and Vr factors proposed in the paper. Circularity of a particle is defined as $4\cdot\pi\cdot(\text{Area})/(\text{Perimeter})^2$, where the area is the projected area of the particle. An ideal spherical particle will thus have a circularity of 1, while particles with other shapes will have circularity values between 0 and 1. Particle shape can further be characterized using aspect ratio, defined as the ratio of particle length to particle breadth, where length is the maximum distance between two points on the perimeter and breadth is the maximum distance between two perimeter points linked by a line perpendicular to length.

The advantage of a material with a circularity above 0.7 and an aspect ratio below 1.5 is the stability of the material due to the low surface area thereof.

In an embodiment, D50 of the secondary particles is between 3 and 50 µm, preferably between 5 and 25 µm. This is advantageous in that such particle sizes enable easy powder handling and low surface area, while maintaining sufficient surface to transport lithium in and out of the structure during discharge and charge.

One way to quantify the size of particles in a slurry or a powder is to measure the size of a large number of particles and calculate the characteristic particle size as a weighted mean of all measurements. Another way to characterize the size of particles is to plot the entire particle size distribution, i.e. the volume fraction of particles with a certain size as a function of the particle size. In such a distribution, D10 is defined as the particle size where 10% of the population lies below the value of D10, D50 is defined as the particle size where 50% of the population lies below the value of D50 (i.e. the median), and D90 is defined as the particle size where 90% of the population lies below the value of D90. Commonly used methods for determining particle size distributions include laser diffraction measurements and scanning electron microscopy measurements, coupled with image analysis.

In an embodiment, the distribution of the agglomerate size of the secondary particles is characterized in that the ratio between D90 and D10 is smaller than or equal to 4. This corresponds to a narrow size distribution. Such a narrow size distribution, preferably in combination with D50 of the secondary particles being between 3 and 50 µm, indicates that the lithium positive electrode material has a low number of fines and thus a low surface area. In addition, a narrow particle size distribution ensures the electrochemical response of all the secondary particles of the lithium positive electrode material will be essentially the same so that stressing a fraction of the particles more than the rest is avoided.

In an embodiment, the capacity of the lithium positive electrode active material is above 120 mAh/g. This is measured at least at a discharge current of 30 mA/g. Preferably the capacity of the lithium positive electrode active material is above 130 mAh/g at a current of 30 mA/g. Discharge capacities and discharge currents in this document are stated as specific values based on the mass of the active material.

In an embodiment, the separation between the two Ni-plateaus around 4.7 V of the lithium positive electrode active material is at least 50 mV. A preferred value of the plateau separation is about 60 mV. The plateau separation is a measure of the energies related to insertion and removal of lithium at a given state of charge and this is influenced by the choice and amount of dopant and whether the spinel phase is disordered or ordered. Without being bound by theory, a plateau separation of at least 50 mV seems advantageous since this occurs to be related to whether the that the lithium positive electrode active material is in an ordered or a disordered phase. The plateau separation is e.g. 60 mV, and a maximum value is about 100 mV.

According to another aspect, the invention relates a process for preparing a lithium positive electrode active material comprising at least 95 wt % spinel having a chemical composition of $Li_xNi_yMn_{2-y-z1-z2}D1_{z1}D2_{z2}O_4$, wherein $0.9 \leq x \leq 1.1$, $0.4 \leq y \leq 0.5$, $0.005 \leq z1 \leq 0.2$ and $0.0 \leq z2 \leq 0.2$, wherein D1 and D2 are dopants chosen between the following elements: Co, Cu, Ti, Zn, Mg, Fe or combinations thereof, where D1 and D2 are different dopants and the lithium positive electrode active material is composed of material particles, wherein the distribution of dopant D1 is non-uniform along a radial axis of the material particles and wherein the distribution of dopant D2 is uniform along the radial axis of the material particles. The process comprises the steps of:

a) providing a lithium positive electrode active material comprising at least 95 wt % spinel having a chemical composition of $Li_xNi_yMn_{2-y-z2}D2_{z2}O_4$, wherein $0.9 \leq x \leq 1.1$, $0.4 \leq y \leq 0.5$, and $0 \leq z2 \leq 0.2$, b) mixing the lithium positive electrode active material of step a) with a dopant precursor of the dopant D1, c) heating the mixture of step b) to a temperature of between 300° C. and 700° C.

A method of providing a lithium positive electrode active material is for example as described in the patent application WO17032789 A1.

In an embodiment, the temperature of step c) and the duration in time of step c) are controlled so as to prevent uniform distribution of the dopant D1 throughout the lithium positive electrode material. For relatively short durations of time of step c) the temperature of step c) should be relatively higher, whilst for relatively long durations of time of step c) the temperature of step c) should be relatively lower.

A third aspect of the invention relates to a secondary battery comprising a positive electrode which comprises the lithium positive electrode active material according to any of the invention.

The invention claimed is:

1. A lithium positive electrode active material comprising at least 95 wt % spinel having a chemical composition of $Li_xNi_yMn_{2-y-z1-z2}D1_{z1}D2_{z2}O_4$, wherein $0.9 \leq x \leq 1.1$, $0.4 \leq y \leq 0.5$, $0.005 \leq z1 \leq 0.2$, $0 \leq z2 \leq 0.2$, wherein D1 and D2 are dopants chosen between the following elements: Co, Cu, Ti, Zn, Mg, Fe or combinations thereof, where D1 and D2 are different dopants, wherein the lithium positive electrode active material is a powder composed of material particles, wherein the distribution of dopant D1 is non-uniform along a radial axis of the material particles and wherein the distribution of the dopant D2 is substantially uniform along the radial axis of the material particles.

2. The lithium positive electrode active material according to claim 1, wherein said material particles of said lithium positive electrode active material are primary particles, where the primary particles form secondary particles, wherein at least 95% of the primary particles have a diameter or a volume equivalent diameter of between 100 nm and 2 µm and where at least 95% of the secondary particles have a diameter or volume equivalent diameter of between 1 µm and 25 µm.

3. The lithium positive electrode active material according to claim 2, wherein the primary particles of the lithium positive electrode active material are surface modified with the dopant D1.

4. The lithium positive electrode active material according to claim 2, wherein the dopant D1 is present in the outermost 20% of the primary particles.

5. The lithium positive electrode active material according claim 2, wherein the dopant D1 is part of the spinel.

6. The lithium positive electrode active material according to claim 1, wherein said material particles of said lithium positive electrode active material are secondary particles made up of primary particles, wherein the diameter or the volume equivalent diameter of the primary particles is between 100 nm and 2 μm and where the diameter or the volume equivalent diameter of the secondary particles is between 1 μm and 25 μm.

7. The lithium positive electrode active material according to claim 6, wherein the secondary particles of the lithium positive electrode active material are surface modified with the dopant D1.

8. The lithium positive electrode active material according to claim 6, wherein the dopant D1 is present in the outermost 20% of the secondary particles.

9. The lithium positive electrode active material according to claim 6, wherein the dopant D1 is part of the spinel.

10. The lithium positive electrode active material according to claim 1, wherein the oxidation state of the dopant D1 is larger than 2.

11. The lithium positive electrode active material according claim 1, wherein said lithium positive electrode active material is cation disordered.

12. The lithium positive electrode active material according to claim 1, wherein said lithium positive electrode active material has a tap density of at least 1.9 g/cm$^3$.

13. The lithium positive electrode active material according to claim 1, wherein the BET surface area of the secondary particles is below 0.25 m$^2$/g.

14. The lithium positive electrode active material according to claim 2, wherein the secondary particles have an average circularity higher than 0.90 and simultaneously an average aspect ratio lower than 1.50.

15. The lithium positive electrode active material according to claim 2, wherein D50 of the secondary particles is between 3 and 50 μm.

16. The lithium positive electrode active material according to claim 15, wherein the distribution of the agglomerate size of the secondary particles is such that the ratio between D90 and D10 is smaller than or equal to 4.

17. The lithium positive electrode active material according to claim 1, wherein the capacity of the lithium positive electrode active material is above 120 mAh/g.

18. The lithium positive electrode active material according to claim 1, wherein the separation between the two Ni-plateaus around 4.7 V of the lithium positive electrode active material is at least 50 mV.

19. A process for preparing the lithium positive electrode active material of claim 1,
said process comprising the steps of:
a) providing a lithium positive electrode active material comprising at least 95 wt % spinel having a chemical composition of $Li_xNi_yMn_{2-y-z2}D2_{z2}O_4$, wherein $0.9 \leq x \leq 1.1$, $0.4 \leq y \leq 0.5$, and $0 \leq z2 \leq 0.2$,
b) mixing the lithium positive electrode active material of step a) with a dopant precursor of the dopant D1,
c) heating the mixture of step b) to a temperature of between 300° C. and 700° C.

20. The process according to claim 19, wherein the temperature of step c) and the duration in time of step c) are controlled so as to prevent uniform distribution of the dopant D1 throughout the lithium positive electrode material.

21. A secondary battery comprising a positive electrode which comprises the lithium positive electrode active material according to claim 1.

* * * * *